June 16, 1942.  F. E. CHEEVER  2,286,715
THREAD CHASING ATTACHMENT FOR LATHES
Filed Nov. 6, 1939  3 Sheets-Sheet 1

Inventor
Frank E. Cheever
by Wright Brown Quinby & May
Attys.

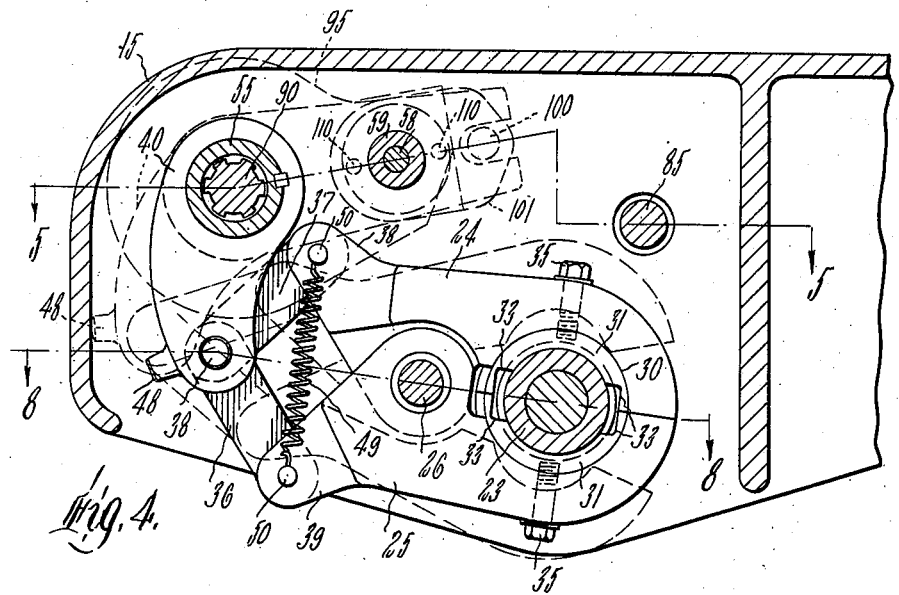

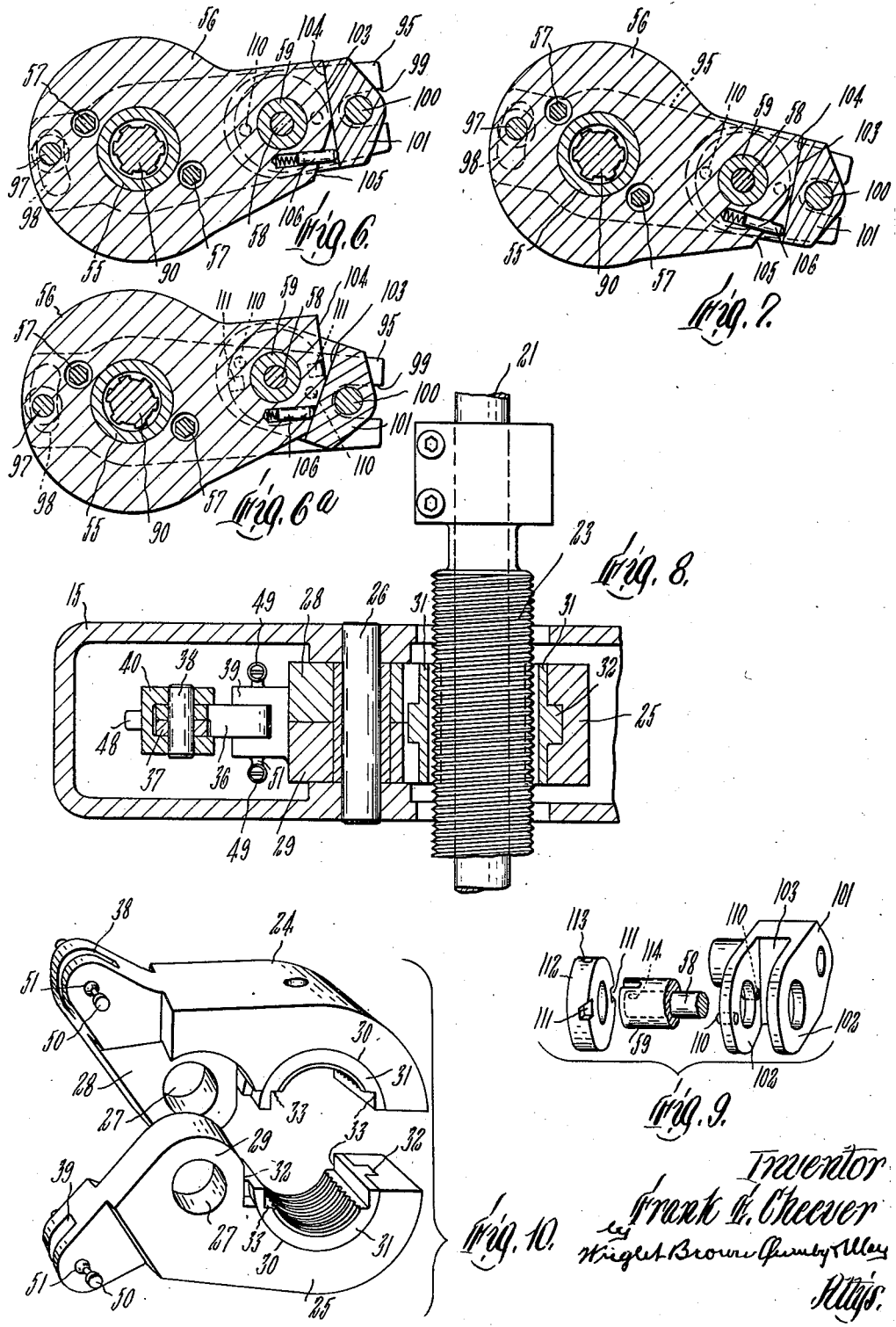

Patented June 16, 1942

2,286,715

UNITED STATES PATENT OFFICE 2,286,715

THREAD CHASING ATTACHMENT FOR LATHES

Frank E. Cheever, Springfield, Vt., assignor to Jones & Lamson Machine Company, Springfield, Vt., a corporation of Vermont Application November 6, 1939, Serial No. 303,075

7 Claims. (Cl. 29—47)

This invention relates to thread chasing, and has for one object the provision of an attachment which may be applied to a turret lathe, and which is capable of accurate work on heavy stock. To this end a lead screw is employed, together with a cooperating nut formed in semicylindrical sections, which are planed on the joint, and then clamped together for boring and threading, so that when these parts are pressed together on the lead screw they completely surround it. Where a nut segment only is employed, it may be sprung away from the lead screw under heavy cuts, particularly where V threads are employed, which would result in shortening the lead of the thread cut from that desired.

Another object is the provision of simple and positive means for holding the two nut segments together for thread chasing, and the provision of knock-off mechanism to free the chasing tool from control by the lead screw when desired, or when the thread has been chased to the desired extent.

For a more complete understanding of this invention, reference may be had to the accompanying drawings, in which Figures 1 and 2 are fragmentary top plan and front elevational views, respectively, of a turret lathe embodying the invention.

Figures 3 and 4 are detail sections, Figure 4 being on a larger scale, on sections 3—3 and 4—4, respectively, of Figure 2. Section line 4—4 appears, also, on Figure 5.

Figures 5 and 8 are detail sections on lines 5—5 and 8—8, respectively, of Figure 4.

Figure 6 is a detail section on line 6—6 of Figure 5.

Figure 6a is a view similar to Figure 6, but showing the parts in unlatched positions.

Figure 7 is a view similar to Figure 6, but showing the parts in knocked-off positions.

Figures 9 and 10 are detail perspectives of a pair of latch elements and the lead screw nut mechanism, respectively.

Figure 1:
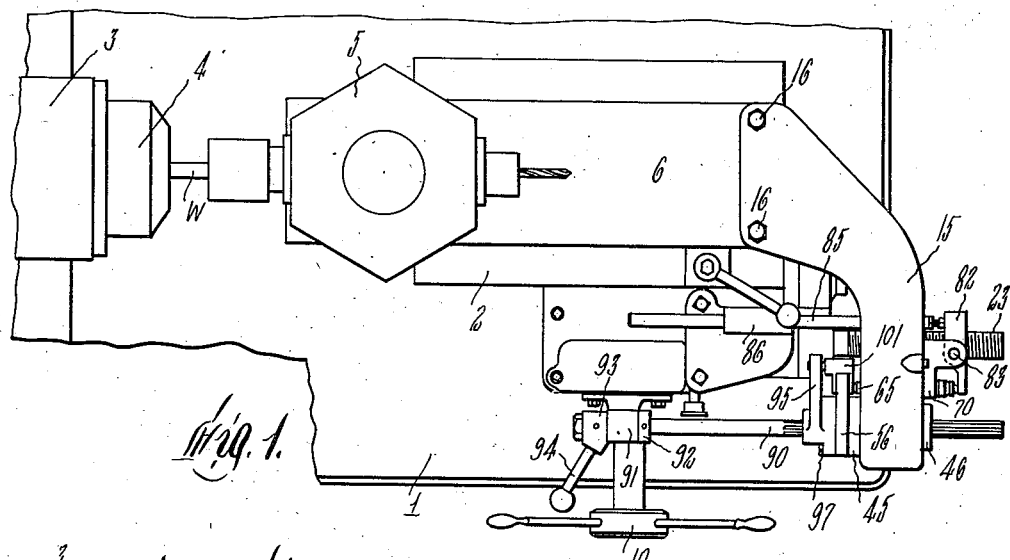
Figure 2:
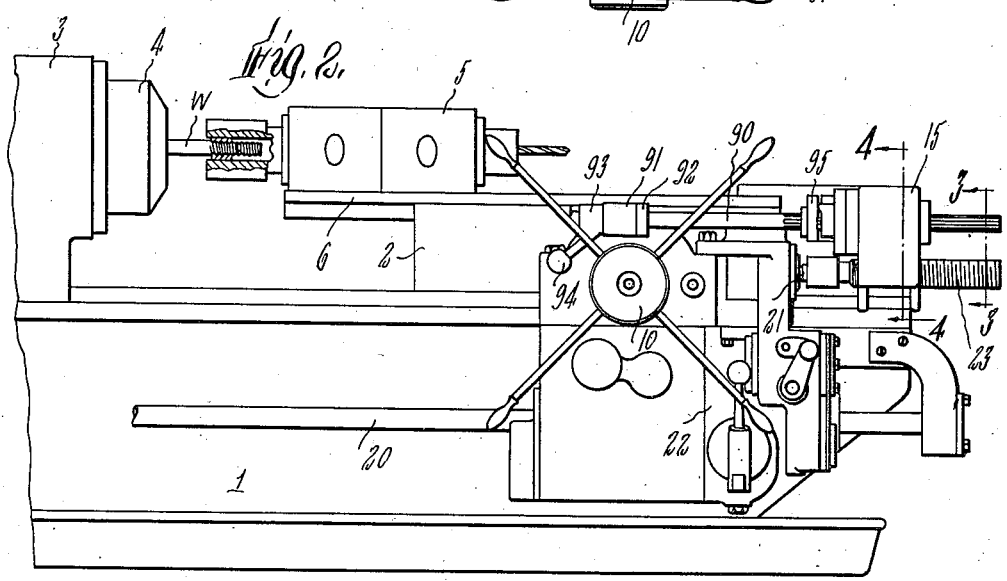

Referring to Figures 1 and 2, at 1 is indicated the bed of the machine having ways on its top face for the slidable reception of a carriage 2. At 3 is indicated the headstock of the machine having a rotary spindle provided with a chuck 4 of any suitable type for supporting work W to be operated upon by tools carried by the turret 5, which is supported on the turret slide or carriage 6 movable axially on the carriage 2. The carriage 2 may be clamped to the bedways at the desired position to suit the length of the work when the machine is set up.

The chasing attachment forming the subject matter of this invention comprises a supporting bracket 15 which may be secured as by screws 16 to the rear end portion of the turret slide or carriage 6 and which carries lead screw engaging means as will later appear. At 20 is illustrated a feed shaft which may be arranged as shown in the Lovely et al. Patent No. 2,094,993. The shaft 20 drives an axially fixed shaft 21 through a train of gears in the gear box at 22, and to the shaft 21 may be clamped a lead screw 23 shown in the form of a sleeve enclosing shaft 21. It will be understood that a lead screw will be furnished for each lead of thread to be cut. Means carried by the bracket 15 are arranged to releasably engage this lead screw 23. Such means are shown detached in Figure 10, and comprise a pair of jaws 24, 25. These jaws are arranged to be pivoted together as by a pivot pin 26 extending through holes 27 in ears 28 and 29 of these jaws. The mating faces of the jaw members 24 and 25 are formed with semicylindrical recesses 30 for the reception of segmental nut elements 31 which may be provided with peripheral segmental flanges 32 for engagement in correspondingly shaped recesses in the jaw members. It will be understood that there will be a pair of such segments 31 provided for each lead screw so as to conform to the character of the threads thereon. These segments 31 together form a cylindrical nut divided diametrically. They are clamped together for boring and threading after being planed on the joint, so that when pressed firmly together they form a complete circle around the periphery of the lead screw engaged thereby. Each segment, therefore, forms a half of the complete nut and each is secured in position within its jaw member as by a cap screw 35 (Figure 4). The thread portions of each half nut are preferably relieved at the ends, as shown, at 33. These jaws are arranged to be opened and closed by a pair of toggle links 36 and 37 pivoted between bifurcations 38 and 39 at the outer ends of the ears 28 and 29.

The toggle links 36 and 37 are pivoted together on the pin 38, which also engages between the forks of the extremity of a rock arm 40. The rock arm 40, as shown best in Figure 5, is keyed to a quill 41 which is journaled in spaced bearings 42 and 43 of the bracket member 15, the rock arm 40 being positioned between these bearings. The quill 41 is provided outwardly of the bearing 43 with a flange 45 which bears against this bearing and its other end portion has secured thereon, as by a set screw 44, a ring 46 so that the quill is held against axial motion relative to the bearings 42 and 43. By rocking of the quill 41 the toggle links can be moved between the full and dotted line positions of Figure 4. In the full line position, they are moved toward straightened position but never sufficiently far to lock, forcing the jaws 24 and 25 into operative engagement with the lead screw, while when these parts are in the dotted line position with a stop lug 48 on the arm 40 in contact with the inner face of the bracket portion 15, the toggles are open and the jaws 24 and 25 open so as to hold the nut segments released from the lead screw. These jaws are normally urged into released position as by means of a pair of coil springs 49, each having its ends engaging pins 50 extending outwardly from the pivots 51 on which the outer ends of the toggle levers 36 and 37 are pivoted.

The quill 41 has an end portion 55 of reduced diameter over which is positioned the inner perforated end of a latch-carrying arm 56, this arm being secured as by screws 57 to the flange 45 so as to rock with the quill. This arm 56 carries a latch member comprising a latch pin 58 slidable through a sleeve 59 secured as by a set screw 60 in an opening through the arm 56. The latch pin 58 is normally projected outwardly as by means of a coil spring 61 seated in a socket 62 in the sleeve 59 and reacting between the base of this socket and a peripheral flange 63 on the latch pin. This latch pin 58 is arranged to cooperate with a keeper 65 fixed in the bracket 15, when the quill is in such angular position that the arm 49 is in the angular position where it holds the segmental nut members in cooperative relation to the lead screw. The keeper 65 is shown in the form of a sleeve which extends through opposite wall members 67 and 68 of the bracket 15 and which may be secured therein as by a nut 69 engaging a threaded portion thereof and butting the inside of the wall 68 and a bracket member 70 engaging a portion 71 of larger diameter of the keeper 65 and engaging against a head portion 72 of this keeper.

Figure 3:
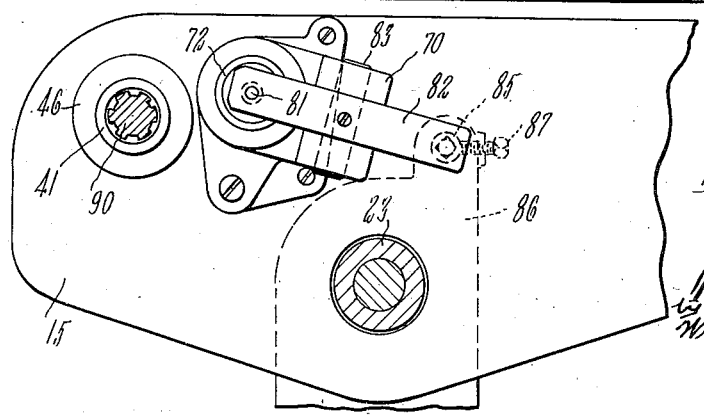

This keeper as shown is provided with a latch-releasing ejector rod 75 which extends through the keeper and may impinge upon the latching end of the latch 58 and force it out of engagement with the keeper. This ejector rod 77 is normally held retracted as by a spring 78 seated in a socket 79 of the keeper and reacting between the base of this socket and a head 80 on the ejector rod. The outer end of this head may be engaged by a hardened wear pin 81 mounted in the end of a lever 82 fulcrumed at 83 on the bracket 70 in position so that its outer end may be struck by the adjustable stop screw 84 of a stop bar 85. This stop bar 85, as shown best in Figure 1, may be secured as by a set screw 87 (Figure 3) in adjusted position in a sleeve 86 fixed to a suitable part of the turret carriage so that when the turret slide has moved to the desired extent through the action of the lead screw, the lever 82 impinges on the bar 85 and the ejector rod 75 is moved to release the latch, permitting the arm 56 to fall and the nut elements to separate from the lead screw by the action of the springs 49.

The nut segments may be moved into position to engage the lead screw, or released therefrom when in engagement, by the operator, by rocking motion of a splined shaft 90 which extends through the quill 41 and is held to the turret carriage, being mounted in a sleeve 91 carried thereby (see Figures 1 and 2), there being a pair of collars 92 and 93 fixed to the shaft 90 as by set screws on either side of the member 91. The collar 93 may have secured thereto an actuating handle 94. This splined shaft 90 has connected thereto for simultaneous rocking motion, but independent axial motion, a latch setting and releasing lever 95. This lever is fulcrumed on the reduced extremity portion 55 of the quill, being provided with a hub portion 96 for this purpose, and it is held against the latch arm 56, but with provision for limited angular motion with respect thereto, by a screw 97 which passes through an arcuate slot 98 in the hub portion 96 and is threaded into the arm 56. The outer end of the arm 95 is slotted as at 99 and between the sides of this slot is positioned a pin 100 projecting from a latch-actuating rock arm 101. This latch actuating rock arm has a portion 102 journaled on the sleeve 59 and it extends over the end of the arm 56. The inner face of the member 101 is provided with a straight surface portion 103 and the end of the arm 56 is provided with a mating straight portion 104 and a portion 105 sloping backwardly therefrom. This sloping face 105 has set thereinto a spring pressed pin 106 which bears against the face 103 of the part 101 and tends to hold the faces 103 and 104 in contact with the arms 56 and 95 in the angular relation shown in Figures 6 and 7. By exerting upward pressure on the handle 94, however, when the latch is retaining the arm 56 in jaw-closing position, the pin 100 engaging the member 101 may move the member 101 against the action of the spring pressed plug 106 and rock member 101 about the axis of the sleeve 59 into the position of Figure 6a. This will cause a pair of cam pins having rounded ends, at 110 (see Figures 5 and 9) to ride out of mating slots 111 of a cam disk 112 secured by a pin 113 to the rear end of the latch 58, thus to retract this disk and latch and release the latch 58 from the keeper so that the arms 95 and 56 are released from their upward position and drop toward the positions shown in Figure 7 where the jaws are open with relation to the lead screw. The pin 113 which secures the cam disk 112 to the latch pin 58 passes through slots 114 in the outer end of the sleeve 59. As soon as the upward pressure on the handle 94 is released, the spring pressed pin 106 returns the member 101 to its normal angular relation to the arm 95 in the position shown in Figure 7. By pushing downwardly on the handle 94 when the jaws are in released position, the arms 95 and 96 are returned to the position of Figure 6 where they become latched automatically, with the lead screw in operative relation to the turret carriage.

From the foregoing description of an embodiment of this invention, it should be evident to those skilled in the art that various changes and modifications might be made without departing from the spirit or scope of this invention as defined by the appended claims.

I claim:

1. In a thread chasing mechanism, a movable carriage, a pair of jaws pivoted together and having a pair of opposed segmental portions defining an internally threaded nut for engagement with a lead screw when said jaws are closed together about their connecting pivot, a rock shaft, means holding said rock shaft against axial motion, a bracket carried by said carriage and through which said shaft extends, a member rockable on said bracket about the axis of said shaft and splined to said shaft, a quill rockably carried by said bracket and through which said shaft is journaled, an arm keyed to said quill, a pair of toggle links connecting said jaws, their common pivotal connection being carried by said arm, a latch arm fixed to said quill, a latch carried by said latch arm, a latch keeper with which said latch may engage in the angular position of said latch arm in which said jaws are in engagement with said lead screw, a latch-releasing member rockably carried by said latch arm, and having means for retracting said latch in one angular position of said member, and operative connections between said rock shaft carried member and releasing member causing rocking of said rock shaft in one direction to release said latch, and in the other direction to turn said quill to jaw-closing position and permitting said latch to engage said keeper.

2. In a thread chasing mechanism, a movable carriage, a pair of jaws pivoted together and having a pair of opposed segmental portions defining an internally threaded nut for engagement with a lead screw when said jaws are closed together about their connecting pivot, a rock shaft, means holding said rock shaft against axial motion, a bracket on said carriage and through which said shaft extends, a member rockable on said bracket about the axis of said shaft and splined to said shaft, a quill rockably carried by said bracket and through which said shaft is journaled, an arm keyed to said quill, a pair of toggle links connecting said jaws, their common pivotal connection being carried by said arm, a latch arm fixed to said quill, a latch carried by said latch arm, a latch keeper with which said latch may engage in the angular position of said latch arm in which said jaws are in engagement with said lead screw, a latch-releasing member rockably carried by said latch arm, and having means for retracting said latch in one angular position of said member, operative connections between said rock shaft carried member and releasing member causing rocking of said rock shaft in one direction to release said latch, and in the other direction to turn said quill to jaw-closing position and permitting said latch to engage said keeper, a latch releasing rod slidable through said keeper, and means actuated by the motion of said carriage by said lead screw to a predetermined position to actuate said rod and release said latch.

3. A machine of the class described, comprising a traversing carriage, a lead screw, an internally threaded member supported by said carriage and movable into and out of engagement with said lead screw and normally held out of such engagement, a rock arm operatively connected to said member for moving said member into and out of engagement with said lead screw, a rock shaft arranged coaxially with said arm, a latch on said arm, a keeper with which said latch may be engaged to hold said member in engagement with said lead screw, a latch-release member carried by said rock arm, and operative connections from said rock shaft to said release member causing rocking of said shaft in one direction to move said rock arm to latched angular position and in the other direction to release said latch and move said rock arm to separate said internally threaded member from said lead screw.

4. A machine of the class described, comprising a traversing carriage, a lead screw, an internally threaded member supported by said carriage and movable into and out of engagement with said lead screw, means tending to move said member out of engagement with said lead screw, a rock arm operatively connected to said member for moving said member into engagement with said lead screw, a second rock arm connected with limited lost motion with said member connected arm, a latch carried by said second arm, a keeper with which said latch may be engaged to hold said member in engagement with said lead screw, a release arm fixed to rock with said member rock arm, a latch releasing member movably carried by said second arm and connected for motion relative to said second arm between latch holding and latch releasing angular position by rocking of said release arm, and a rock shaft connected to said release arm rockable in one direction to move said release arm to inoperative position and after taking up such lost motion to rock said first mentioned rock arm to engage said threaded member with said lead screw and said second arm to latch engaging position, and in the opposite direction during such lost motion to move said release arm to release said latch.

5. A machine of the class described, comprising a traversing carriage, a lead screw, an internally threaded member supported by said carriage and movable into and out of engagement with said lead screw, means tending to move said member out of engagement with said lead screw, a rock arm operatively connected to said member for moving said member into engagement with said lead screw, a second rock arm connected with limited lost motion with said member connected arm, a latch carried by said second arm, a keeper with which said latch may be engaged to hold said member in engagement with said lead screw, a release arm fixed to rock with said member rock arm, a latch releasing member pivoted to said second arm and connected for motion relative to said second arm between latch holding and latch releasing angular position by rocking of said release arm, and a rock shaft connected to said release arm rockable in one direction to move said release arm to inoperative position and after taking up such lost motion to rock said first mentioned rock arm to engage said threaded member with said lead screw and said second arm to latch engaging position, and in the opposite direction during such lost motion to move said release arm to release said latch.

6. A machine of the class described, comprising a traversing carriage, a lead screw, an internally threaded member supported by said carriage and movable into and out of engagement with said lead screw, means tending to move said member out of engagement with said lead screw, a rock arm operatively connected to said member for moving said member into engagement with said lead screw, a second rock arm connected with limited lost motion with said member connected arm, a latch carried by said second arm, a keeper with which said latch may be engaged to hold said member in engagement with said lead screw, a release arm fixed to rock with said member rock arm coaxially with said rock arms, a latch releasing member movably carried by said second arm and connected for motion relative to said second arm between latch holding and latch releasing angular position by rocking of said release arm, and a rock shaft coaxial with said rock arms connected to said release arm rockable in one direction to move said release arm to inoperative position and after taking up such lost motion to rock said first mentioned rock arm to engage said threaded member with said lead screw and said second arm to latch engaging position, and in the opposite direction during such lost motion to move said release arm to release said latch.

7. A machine of the class described, comprising a traversing carriage, a lead screw, an internally threaded member supported by said carriage and movable into and out of engagement with said lead screw, means tending to move said member out of engagement with said lead screw, a rock arm operatively connected to said member for moving said member into engagement with said lead screw, a second rock arm connected with limited lost motion with said member connected arm, a latch carried by said second arm, a keeper with which said latch may be engaged to hold said member in engagement with said lead screw, a release arm fixed to rock with said member rock arm, a latch releasing member pivoted to said second arm and connected for rocking relative to said second arm between latch holding and latch releasing angular position by rocking of said release arm, and a rock shaft coaxial with said rock arms connected to said release arm rockable in one direction to move said release arm to inoperative position and after taking up such lost motion to rock said first mentioned rock arm to engage said threaded member with said lead screw and said second arm to latch engaging position, and in the opposite direction during such lost motion to move said release arm to release said latch.

FRANK E. CHEEVER.